March 28, 1961   C. H. RICHARDS ET AL   2,977,526
CONSTANT VOLTAGE A.C. GENERATOR
Filed Jan. 14, 1958   2 Sheets-Sheet 1
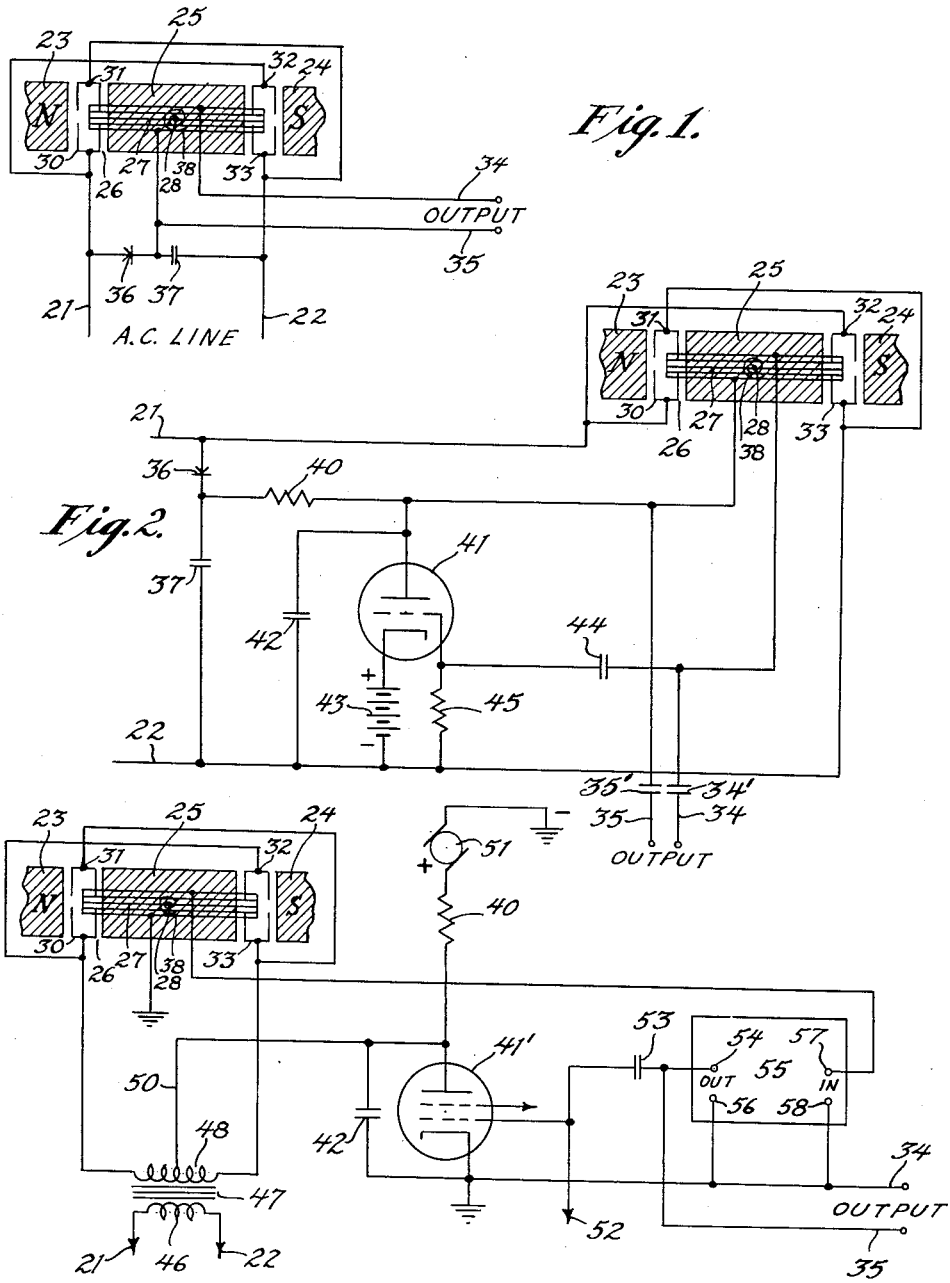
INVENTORS
Charles H. Richards
BY William A. Geohegan
ATTORNEYS March 28, 1961 C. H. RICHARDS ET AL 2,977,526
CONSTANT VOLTAGE A.C. GENERATOR
Filed Jan. 14, 1958 2 Sheets-Sheet 2
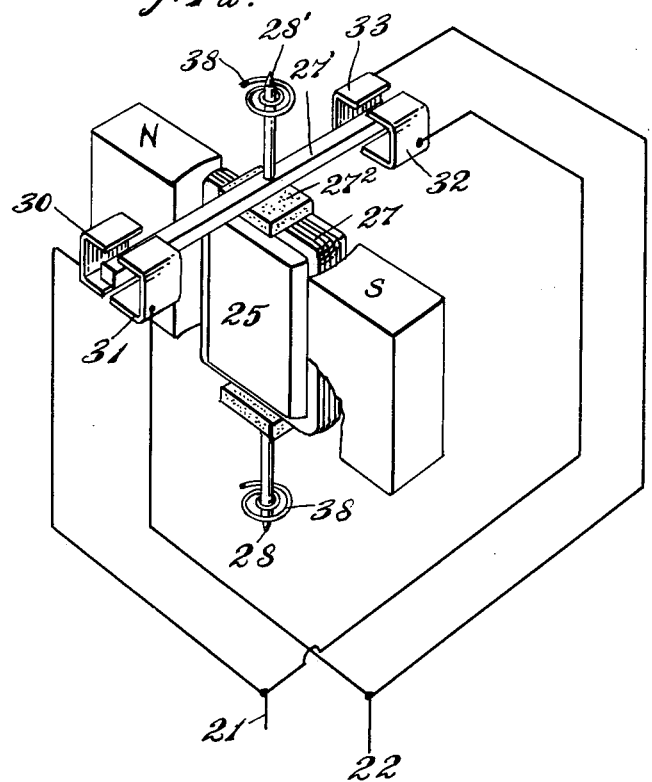
INVENTOR
Charles H. Richards
William A. Geohegan
BY
ATTORNEY United States Patent Office 2,977,526
Patented Mar. 28, 1961

2,977,526
CONSTANT VOLTAGE A.C. GENERATOR
Charles H. Richards, 416 Chestnut Ave., Mamaroneck, N.Y., and William A. Geohegan, 4555 Henry Hudson Parkway, Riverdale, N.Y.
Filed Jan. 14, 1958, Ser. No. 708,892
6 Claims. (Cl. 322—3)

The present invention relates to a constant voltage generator of alternating current.

A purpose of the invention is to generate an alternating current having a pure sine wave.

A further purpose is to provide a generator for a pure sine wave whose amplitude and phase are insensitive to variation in line frequency and voltage.

A further purpose is to produce a smaller, simpler and less expensive generator of a pure sine wave.

A further purpose is to set up a constant magnetic field and to oscillate a conductor back and forth across the field at a frequency which corresponds to the frequency of the desired output alternating current.

A further purpose is to mechanically resonate the conductor by means of a spring, at a frequency approximating the frequency of the desired output alternating current.

A further purpose is to oscillate the conductor by the force of an oscillating electrostatic field, from an alternating current and superimposed D.C., producing a simple harmonic motion.

In the drawings we have chosen to illustrate a few only of the numerous embodiments in which the invention may appear, selecting the forms shown from the standpoints of convenience in illustration, satisfactory operation and clear demonstration of the principles involved.

Figures 1, 2 and 3 of the drawings show electrical diagrams useful in explaining the invention.

Figure 1a is a perspective of a modification.

There is a considerable demand for a constant voltage pure sine wave alternating current for reference purposes. Existing equipment for generating such a sine wave is relatively complex and open to error. An example of such equipment is the reference source employed by Clapp, Regulating A-C with Buck-Boost Amplifier, Electronics (August 1950), pages 99 to 101.

The device of the present invention offers many advantages over the prior art.

The generator of the invention generates a pure sine wave by smaller, simpler and less expensive equipment which is automatically regulated to maintain constant amplitude and phase notwithstanding wide variation of line voltage and frequency.

In accordance with the invention, a constant magnetic field is set up and a conductor, suitably the coil of a d'Arsonval movement, oscillates back and forth across the field at a frequency which corresponds to the driving frequency.

The conductor or coil is mechanically resonated by a spring at a frequency approximating the driving frequency.

In the preferred embodiment the conductor is oscillated in simple harmonic motion by the electrostatic force of an alternating voltage superimposed on a direct voltage. The driving voltage can have harmonics of the fundamental but these are not transmitted to the output, because of the mechanical inertia of the oscillating conductor.

Considering now the drawings in detail, in the simplest embodiment, as shown in Figure 1, A.C. input line connections 21 and 22 are provided. An electromagnetic field is set up, suitably between permanent magnets having a north pole 23 and a south pole 24 with an intermediate core of magnetically susceptible material 25. It will be evident that the magnets and core are suitably stationary, there being an air gap between the magnets and the core at 26 for oscillation of a coil 27 of d'Arsonval type, which is pivotally mounted on an axis 28. It will be evident that the coil desirably surrounds the central core as well known in instrument mountings.

While a permanent magnet source of magnetic field is shown it will be evident that it is not important to the present invention whether the field is obtained from a permanent magnet or an electromagnet.

Electrostatic plates 30, 31, 32 and 33 are symmetrically placed in pairs on opposite sides of the coil, each plate suitably extending inside and outside of one of the opposed sides of the coil which extends through the space 26 between the magnet and the core, the plates being insulated from one another, equally spaced from the center plane which extends through the middle of the magnets and the axis, and equally spaced also in the preferred embodiment from the center of the portion of the winding between each pair of plates so that the influence of each plate on the coil motion is symmetrical. Plates 30 and 32 operating similarly on opposite sides of the coil are connected to lead 21 and plates 31 and 33 which are at the diagonally opposite positions are connected to lead 22.

The coil has opposing leads 34 and 35 connected to the output, lead 35 in Figure 1 also being connected to one side of rectifier 36, the other side of the rectifier being connected to incoming line 21, while lead 35 is also connected to filter capacitor 37, the opposite side of which is connected to incoming line 22.

In operation it will be evident that the coil suspended in the magnetic field is driven electrostatically. Since its plates are symmetrical, a D.C. voltage applied to the electrostatic plates or electrodes will cause no oscillation of the coil, but the alternating current applied to the incoming lines 21 and 22 will cause the coil to oscillate and the oscillation will conform to a simple harmonic motion. The coil suspension involves helical springs 38 at the top and bottom whose outer ends are supported on a suitable support not shown, and the springs have the effect of resonating the motion of the coil.

While direct current will not cause oscillation of the coil, the superimposed direct current voltage will proportionately influence the amplitude of oscillation and hence the output voltage of the coil.

The circuit of Figure 1 lends itself to the production of a very small device which is simple and inexpensive.

For best results the combination of the spring and coil should be mechanically resonated at or near the desired frequency of the output sine wave, that is within ±10 percent. The coil will oscillate at the fundamental driving frequency.

The output in the form of Figure 1 will be pure sine wave whose amplitude varies with line voltage.

It will be evident that the electrostatic driving electrodes may act on a separate suitably metallic driving conductor 27' insulated at 27² from the coil 27, but mechanically connected thereto as shown in Figure 1a. The conductor 27' is preferably grounded through pivot 28' to the frame. This avoids electrostatic coupling between the driving electrodes and the coil output, and reduces the air gap 26.

Figure 2 illustrates a method of regulating the amplitude of the output voltage of pure sine wave, within close limits, suitably of the order of ½ volt to one volt in 120 volts. In Figure 2 the influence of the D.C. polarizing voltage is used to regulate the amplitude of the output sine wave.

As illustrated in Figure 2, the circuit arrangement is rather similar to Figure 1 except that a suitable amplifier vacuum tube has been added. Interposed between the output lead 35 on the one hand and the rectifier 36 and filter condenser 37 on the other hand is a plate load resistor 40, and the output lead 35 is also connected to the anode of vacuum tube 41 and to one side of shunt capacitor 42, the other side of which is connected to incoming line 22. A source of D.C. reference voltage, in this case a battery 43, has its positive side connected to the cathode of the vacuum tube and its negative side connected to incoming line 22.

The control grid of the vacuum tube is connected through a blocking capacitor 44 with output lead 34 and also through grid leak resistor 45 to the incoming line 22.

Blocking capacitors 34' and 35' are in series with the respective output leads.

The preferred dimensions and types of the components are as follows, for an incoming source of 120 volts at 60 cycles:

Vacuum tube 41, Type 6F5
Reference voltage 43, approximately equal to peak of output
Plate load resistor 40, 1 megohm
Filter capacitor 37, 8 microfarads
Shunt capacitor 42, 0.25 microfarad
Blocking capacitor 44, 0.01 microfarad
Grid leak resistor 45, 1 megohm
Blocking capacitors 34' and 35', 0.01 microfarad.

The operation of this form is as follows:

When the driving voltage is such that the peak voltage of the output is well below the reference voltage 43, tube 41 is at cut-off and no current flows through its plate resistor 40. When, however, the peak output voltage approaches the reference voltage 43 the vacuum tube 41' draws appreciable current at the peak of every cycle, reducing the D.C. polarizing voltage and in turn reducing the output. In this way it tends to maintain the output constant.

Figure 3 illustrates a somewhat similar circuit to that of Figure 2 except that a tetrode 41' is used in a somewhat modified circuit. The incoming power lines 21 and 22 are connected to the primary 46 of a transformer 47 having a middle tap secondary 48. The ends of the secondary are connected to the electrostatic plates or electrodes as in the other forms just described. The center tap 50 of the secondary is connected to the anode of vacuum tube 41', and also through plate load resistor 40 to source of D.C. superimposed voltage 51 suitably at +700 volts. The center tap 50 is also connected through shunt capacitor 42 to ground.

The cathode of the vacuum tube 41' is also connected to ground. A suitable source is connected to the screen grid as well known. The control grid of the vacuum tube is connected to −86 volts D.C. reference voltage 52 and through optional coupling capacitor 53 is connected to output terminal 35 and also to output terminal 54 of RC amplifier 55. The other output terminal 56 of the RC amplifier is connected to ground and to output terminal 34. The input terminal 57 of the RC amplifier is connected to one side of the moving coil 27, the other side of which is grounded. The other input terminal 58 of the RC amplifier is connected to ground.

It will be evident that the alternating current to drive the coil passes out through the ends of the secondary 48 while the direct current which influences the amplitude of oscillation and hence influences the output voltage and provides regulation is conducted from the center tap 50 to polarize all drive electrodes.

The device regulates automatically holding the A.C. output voltage within narrow limits in fixed relation to the D.C. reference voltage. In an actual design using the following dimensions for the components, the amplified output voltage was maintained within one-half volt to one volt at about 120 volts:

Input voltage 120 volts
Voltage across secondary to transformer ±400 volts
Vacuum tube 41' type 6AU6, with a grid cutoff voltage of about 3 volts
Voltage on screen +80
Voltage on plate resistor +700
Plate resistor 3.0 megohms
Shunt capacitor 42, 0.005 microfarad
Coupling capacitor 53, 0.05 microfarad
Amplifier 55, RC coupling amplifier with a gain of about 100

In operation it will be evident that until the output reaches about 83 volts peak, the vacuum tube draws no current and the full D.C. supply is applied to the electrostatic plates or electrodes. When, however, the output exceeds this value by only a small amount, the vacuum tube draws current and reduces the D.C. voltage applied on the electrostatic plates, reducing the output. In the specific embodiment the output varied about 0.3 percent for driving voltage changes of 20 percent.

Thus it will be evident that good regulation is obtained by this device.

It will of course be evident that a rectified output can be used for the D.C. constant voltage reference source.

In view of our invention and disclosure, variations and modifications to meet individual whim or particular need will doubtless become evident to others skilled in the art, to obtain all or part of the benefits of our invention without copying the process and structure shown, and we, therefore, claim all such insofar as they fall within the reasonable spirit and scope of our claims.

Having thus described our invention, what we claim as new and desire to secure by Letters Patent is:

1. In a generator having an output, means for setting up a magnetic field, a conductor positioned in said magnetic field and connected in an electric circuit with the output, means suspending the conductor to oscillate and cut lines of force in the field, and means for oscillating the conductor back and forth in the field comprising means including plates in position to electrostatically act on said conductor, a source of alternating current connected to said plates and a source of superimposed direct current connected to said plates.

2. A generator of claim 1, in combination with means responsive to the output for regulating the output voltage.

3. A generator of claim 1, in combination with means for keeping the A.C. output constant by regulating the D.C. component of the electrostatic field.

4. A generator of claim 3, in which the means for keeping the A.C. output constant comprises a source of D.C. reference voltage and vacuum tube means connected to said source and to the A.C. output to oppose change in output voltage.

5. A generator of claim 4, comprising means for comparing the D.C. reference voltage and the A.C. output from the conductor, through the vacuum tube means, and applying the output of the vacuum tube means to vary the superimposed driving voltage in a direction to oppose change in output.

6. A generator of claim 1, in which the means for oscillating the conductor comprises an electrostatic operating element electrically insulated and mechanically connected to the conductor.

References Cited in the file of this patent

UNITED STATES PATENTS

| | | |
|---|---|---|
| 1,637,442 | Dorsey | Aug. 2, 1927 |
| 1,974,483 | Brown | Sept. 25, 1934 |
| 2,034,787 | Williams | Mar. 24, 1936 |
| 2,475,200 | Roy | July 5, 1949 |
| 2,542,494 | Felici | Feb. 20, 1951 |
| 2,738,386 | Roberts | Mar. 13, 1956 |
| 2,751,573 | Millington | June 19, 1956 |

FOREIGN PATENTS

| | | |
|---|---|---|
| 129,143 | Sweden | Aug. 15, 1950 |